United States Patent [19]

Wilkie, Jr.

[11] Patent Number: 4,958,262
[45] Date of Patent: Sep. 18, 1990

[54] APPARATUS AND METHOD FOR FACILITATING DOUBLE BLOCKING AT A DISTRIBUTING FRAME IN A TELEPHONE CENTRAL OFFICE

[75] Inventor: Harold G. Wilkie, Jr., Flat Rock, Mich.

[73] Assignee: Michigan Bell Telephone Company, Detroit, Mich.

[21] Appl. No.: 155,230

[22] Filed: Feb. 12, 1988

[51] Int. Cl.$^5$ .............................................. H01R 9/00
[52] U.S. Cl. .................................. 361/426; 29/525.1; 379/329; 439/131; 439/142; 361/429
[58] Field of Search ................... 379/326–329; 439/709, 131, 142; 29/525.1; 361/426–429, 417–420

[56] References Cited

U.S. PATENT DOCUMENTS

| | | | |
|---|---|---|---|
| 2,328,724 | 9/1943 | Johnson et al. | 379/327 |
| 3,780,351 | 12/1973 | Salmon et al. | 379/328 |
| 3,904,936 | 9/1975 | Hamrick | 361/428 |
| 4,618,194 | 10/1986 | Kwilos | 379/329 |
| 4,675,900 | 6/1987 | Temkin | 379/329 |

Primary Examiner—Gregory D. Thompson
Attorney, Agent, or Firm—Brooks & Kushman

[57] ABSTRACT

Adaptor brackets are arranged for use with conventional telephone equipment connector blocks having cross-connect fields normally presented to the technician in a predetermined plane. Through use of the brackets the plane of the cross-connect fields may be temporarily rotated from the predetermined plane thereby facilitating access to the cross-connect field terminal strips during a double blocking technique used at a distributing frame of a telephone central office in preparation for subsequent cut-over of new switching system equipment.

20 Claims, 4 Drawing Sheets

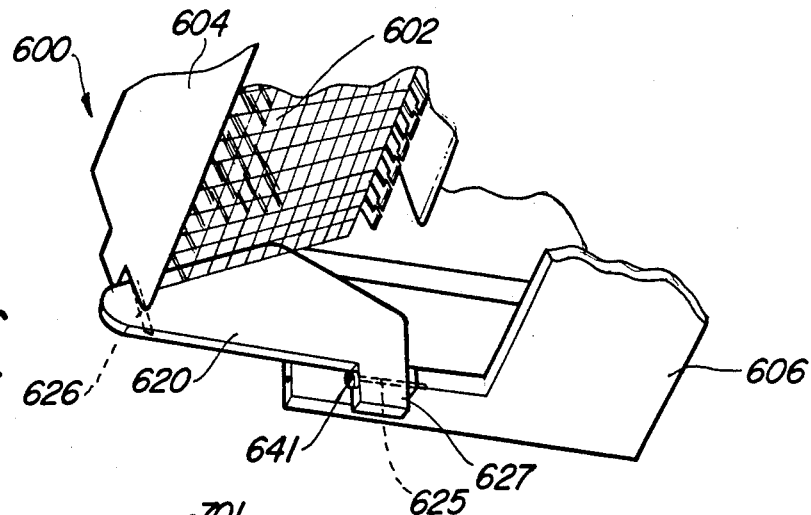
*Fig-6*
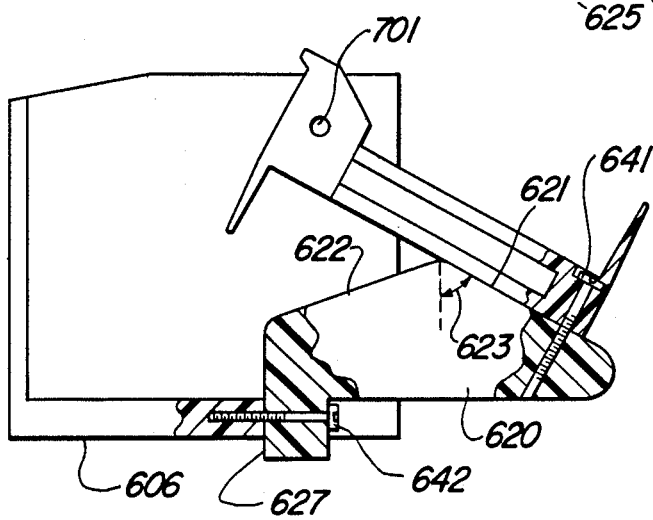
*Fig-7*
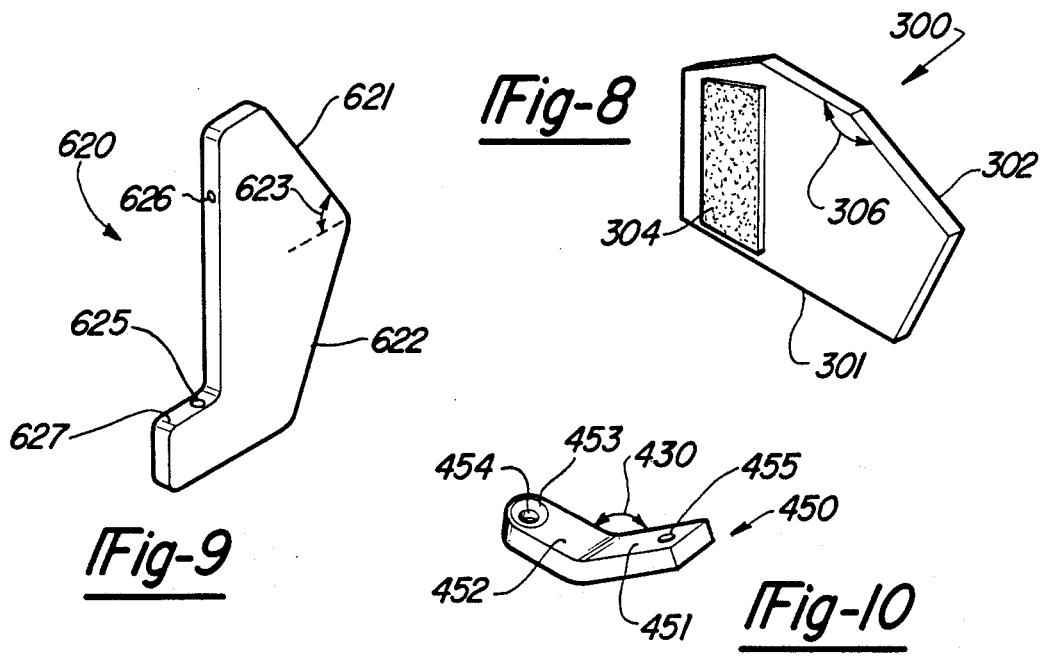
*Fig-8*
*Fig-9*
*Fig-10*

APPARATUS AND METHOD FOR FACILITATING DOUBLE BLOCKING AT A DISTRIBUTING FRAME IN A TELEPHONE CENTRAL OFFICE

BACKGROUND OF THE INVENTION

The invention relates generally to mounting brackets for establishing a preselected orientation between two relatively movable surfaces. More specifically, the invention concerns brackets for use with distributing frame connector blocks in telephone central offices.

As telephone central office switching systems equipment has evolved from electromechanical systems, such as step-by-step and crossbar, to space division electronic switching systems and time division digital switching systems, requirements have significantly increased for provision of ways and means for rewiring trunk and line circuits from the outside plant to newly added apparatus embodying the updated technologies within the central office facilities. Cabling activity at the main distributing frame of the central office also is caused by increasing capacity of a particular switching system by providing additional equipment of the existing types.

Naturally, the most economic approach to replacing old equipment with new in a telephone central office is to re-use existing physical space to the maximum possible and practical extent. This goal of reuse extends to the existing mounting space on main distributing frames. To this end, connector blocks were developed which could be temporarily mounted at the main distributing frame for providing cross-connect fields to the outside plant from newly added apparatus. Typically, such connector blocks were mounted adjacent to existing horizontal terminal strip sections of the distributing frame. Then, after the new central office equipment was cut-over into service, the existing horizontal terminal strips were removed, and the new connector blocks were mounted in their place at the main distributing frame.

Now, as urbanization expands, the need is fast approaching for the capability of converting more and more central office equipment to more modern apparatus. Most such central offices already have connector blocks mounted in the space where new blocks will be mounted, thereby necessitating the use of a technique known as "double blocking" in effecting any subsequent central office equipment upgrade. With double blocking, new connector blocks are temporarily mounted in front of existing blocks. Then, after cut-over, the existing connector blocks are removed, and the new blocks are mounted.

A problem with using double blocking for many types of connector blocks arises because the cross-connect fields of the existing blocks are normally oriented in a substantially vertical plane facing outwardly of the main distributing frame. This configuration has precluded use of double blocking, since temporarily mounting a new block directly in front of an existing block would prevent adequate access to the existing terminal fields by the telephone central office technician prior to cut-over of the new central office equipment.

The alternatives to double blocking are unacceptable in terms of service interruptions or labor expense. Without the capability of double blocking to avoid service interruptions, the new connector blocks would have to be physically mounted wherever free space is available—not necessarily adjacent to the existing main distributing frame. This in turn would lead to excessively long jumper cabling and unacceptably high labor costs in moving and remounting the new connector blocks after cut-over of new equipment.

Therefore, there is a need for a method and apparatus for facilitating double blocking for connector blocks having a front facing, vertically oriented terminal field.

SUMMARY OF THE INVENTION

Accordingly, the invention provides for the temporary mounting of new connector blocks in front of existing connector blocks having rotatable terminal fields normally lying in a predetermined plane at a distributing frame in a telephone central office. The terminal field of each existing block is rotated away from the predetermined plane such that the terminal field is accessible. The rotated plane of the terminal field is temporarily maintained through use of an adaptor bracket arranged to maintain the rotated position.

It is a feature of the invention that double blocking is made possible even with front facing cross-connect fields by providing for the temporary alteration of the orientation of the existing cross-connect fields.

It is a further feature of the invention that the working angle of the terminal fields of the blocks mounted on lower main distributing frame shelves may be altered to a more convenient working position for the central office technician.

BRIEF DESCRIPTION OF THE DRAWING

These and other objects and features of the invention will become apparent from a reading of the detailed description taken in conjunction with the drawing, in which:

FIG. 6 is a partial perspective view from the bottom of a third type of connector block and adaptor bracket;

FIG. 7 is a cross-sectional view of the connector block and associated bracket of FIG. 6;

FIG. 8 is a perspective view of the bracket used with the connector block of FIGS. 2 and 3;

FIG. 9 is a perspective view of the bracket used with the connector block of FIGS. 6 and 7; and FIG. 10 is a perspective view of the bracket used with the connector block of FIGS. 4 and 5.

DETAILED DESCRIPTION

Figure 1A:
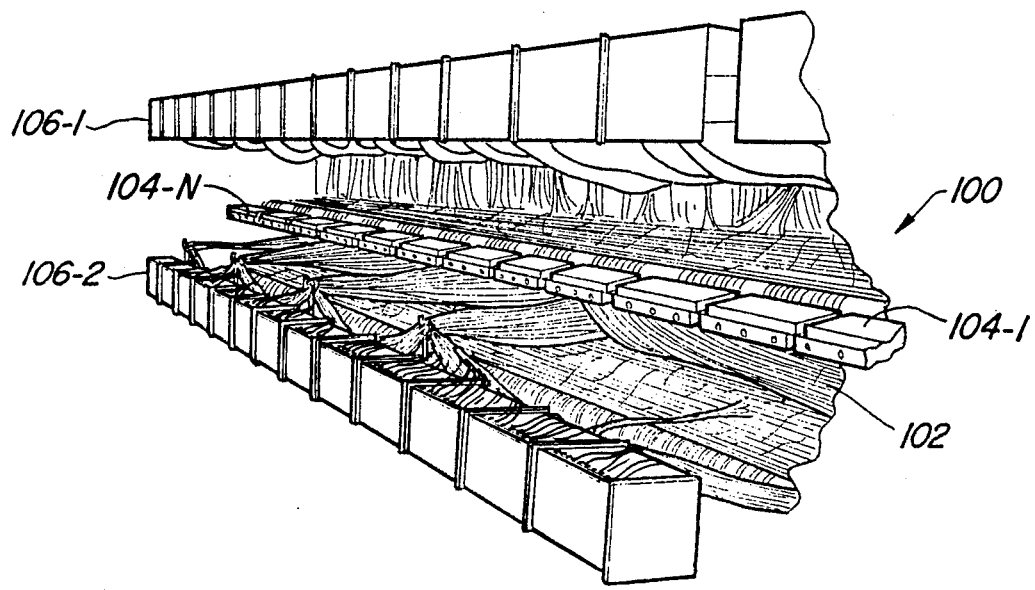
FIG. 1A is a perspective view of a portion of a typical telephone central office main distributing frame showing connector blocks replacing existing horizontal terminal strips.

FIG. 1A sets forth a perspective view of a portion of a typical telephone central office main distributing frame 100 showing both front-facing rows 106-1 and 106-2 of connector blocks 106 and older existing horizontal terminal strip blocks 104-1 through 104-n. Line and trunk cabling from the outside plant typically terminates at a vertical side of the main distributing frame and cross-connect fields are provided for interconnecting the outside plant cabling with the central office apparatus. The cross-connect cabling is shown for example at 102.

The connector blocks 106, such as shown in row 106-2, each have a front vertical face 110 which is parallel to the block's cross-connect terminal strip field for connecting outside plant cabling to the central office equipment. One other row 106-1 of connector blocks 106 is shown at another horizontal position on the main distributing frame 100. The connector blocks shown are mounted, after cut-over of new equipment, in the distributing frame space previously occupied by horizontal terminal strip blocks such as shown at 104-1 through 104-n of FIG. 1A.

Connector blocks have traditionally been added to provide higher density cross-connect fields than were available on conventional main distributing frame terminal strips. Connector blocks 106, 106-1 or 106-2 can be arranged to mount on either the horizontal or vertical side of a main distributing frame. As shown in FIG. 1A, the connector blocks 106 in rows 106-1 and 106-2 are shown mounted to the horizontal side of main distributing frame 100.

The invention is directed, for example, to the situation where new central office equipment is to be added where the main distributing frame, such as shown in FIG. 1A, already has connector blocks in at least some locations. With the new equipment, new connector blocks are required. To enable temporary mounting of the new connector blocks adjacent to distributing frame space they will ultimately occupy after cut-over of the new equipment, the double blocking technique is employed. Double blocking temporarily adds a row of new connector blocks in front of the existing blocks. However, the central office technician must have continued access to the front facing terminal fields of the older blocks prior to cut-over. Therefore, new connector blocks cannot be "double-blocked" immediately in front of existing blocks without making some provision for the required accessibility.

Figure 2:
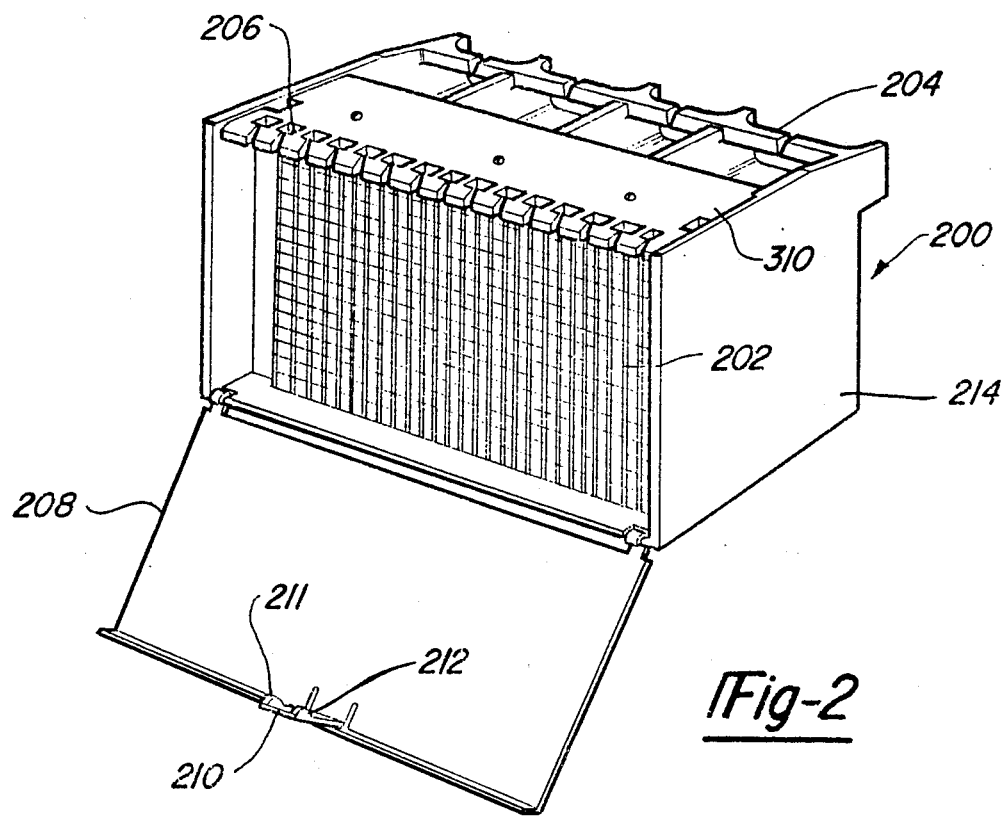
FIG. 2 is a perspective view of a first type of connector block usable in the main distributing frame depicted in FIGS. 1B and 1C.

One conventionally used connector block having a front facing terminal strip is set forth in the perspective view of FIG. 2. Connector block 200 for example could comprise a type 89E commonly used throughout Bell operating companies. Connector block 200 has a vertically oriented cross-connect field 202 which is rotatable with respect to its housing which includes sidewall 214 and a bottom and opposite sidewall not shown in this perspective view. Cross-connect field 202 is mounted on a rotatable terminal field carrier 310. Connector block 200 additionally includes a plurality of jumper cable fanning strips 206 immediately above the front facing cross-connect field and rearwardly located fanning strips 204 serving as cable guides. The cross-connect field 202 may be protected from dust or other debris by the closing of a hinged front cover 208 shown in the open position in FIG. 2. Cover 208 includes a Cover retaining clip 210 having protrusions 211 and 212 which engage two corresponding cable guide openings in the fanning strip 206 to retain cover 208 in a closed position.

Figure 1B:
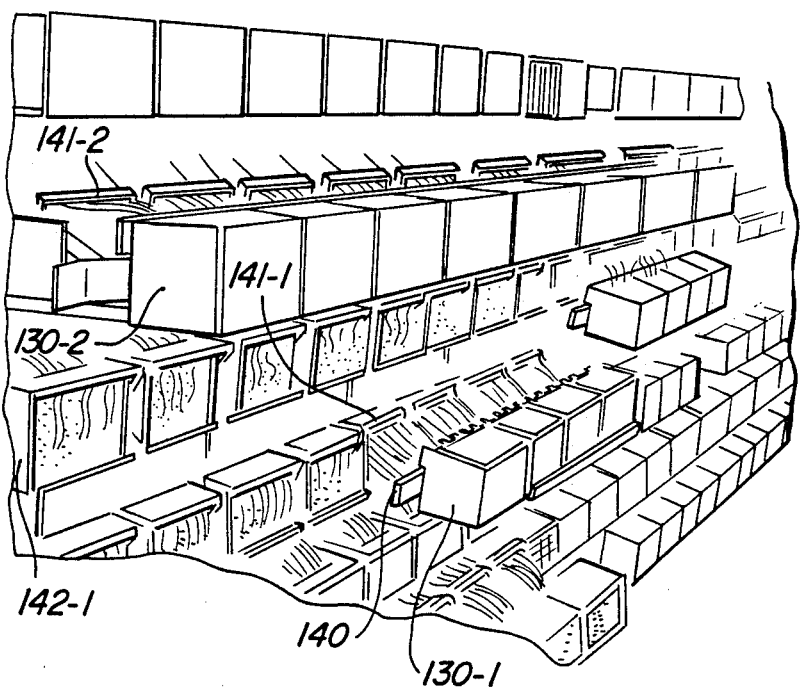
FIG. 1B is a first perspective view of a portion of a typical main distributing frame showing double blocking made possible by temporary reorientation of existing cross-connect fields in accordance with the principles of the invention.
Figure 1C:
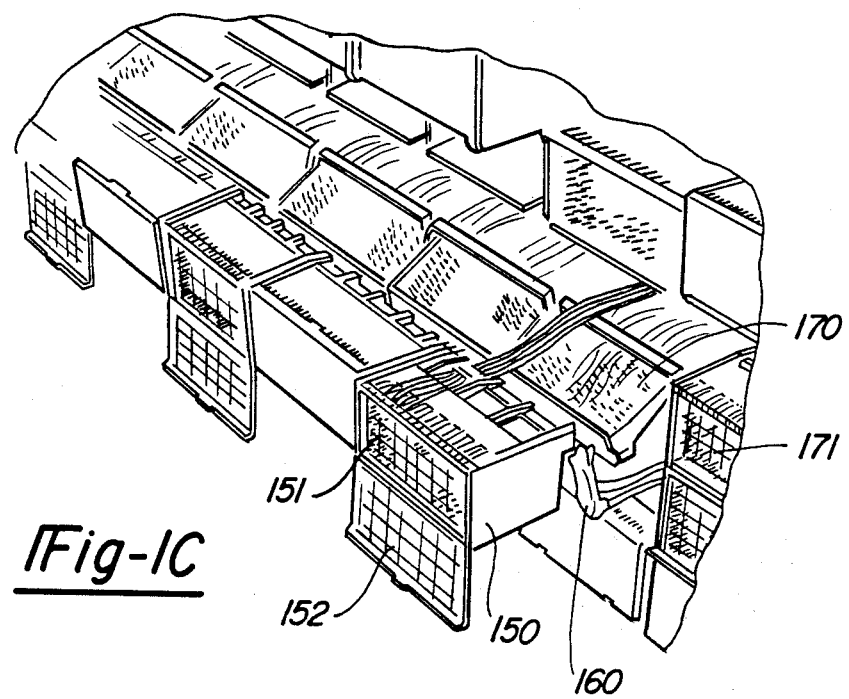
FIG. 1C is a second perspective view of the main distributing frame of FIG. 1B.

To double block connector blocks such as that set forth in FIG. 2, it has been found that suitable access to the cross-connect terminal fields can be maintained by rotating the terminal fields of the older blocks as shown in the perspective views of FIGS. 1B and 1C.

FIG. 1B shows a portion of a distributing frame having rows 130-1 and 130-2 of double-blocked connector blocks 130, with older connector blocks 141, respectively shown with their terminal strip fields tilted from their normal vertical position to enable access thereto during double blocking. The new blocks 130 are temporarily mounted as by a bracket or mounting bar 140. Older block row 142-1 shows positions not yet double blocked and therefore with terminal fields in their normal vertical plane orientation.

FIG. 1C is another perspective view of the distributing frame of FIG. 1B showing a new connector block 150 having a vertically oriented new cross-connect field 151 and an open cover 152. Additionally set forth is a mounting bracket 160 for the connector blocks, a tilted older block 170 and an untilted existing block 171.

To enable double blocking with the connector block 200 of FIG. 2, such blocks must be reoriented as shown in FIGS. 1B and 1C. Such reorientation is achieved with the arrangement of FIG. 3, which is a perspective view of the connector block of FIG. 2 with its cross-connect field rotated for double blocking access using a first type of adaptor bracket 300 designed in accordance with the principles of the invention. As seen from FIG. 3, adaptor bracket 300 is positioned with a first surface 302 bearing against a rearward portion of the terminal strip carrier 310 and a second surface 301 which bears against a bottom housing wall of connector block 200. Bracket 300 is temporarily held in the desired position by a double sided adhesive pad 304 which temporarily affixes bracket 300 to sidewall 214 of the housing of connector block 200. Angle 306 shown between the bearing surface 302 of the bracket 300 and the bracket's top horizontally oriented surface 307 is an angle comprised of 90 degrees plus the desired angle from the vertical plane of the cross-connect field.

Figure 4:
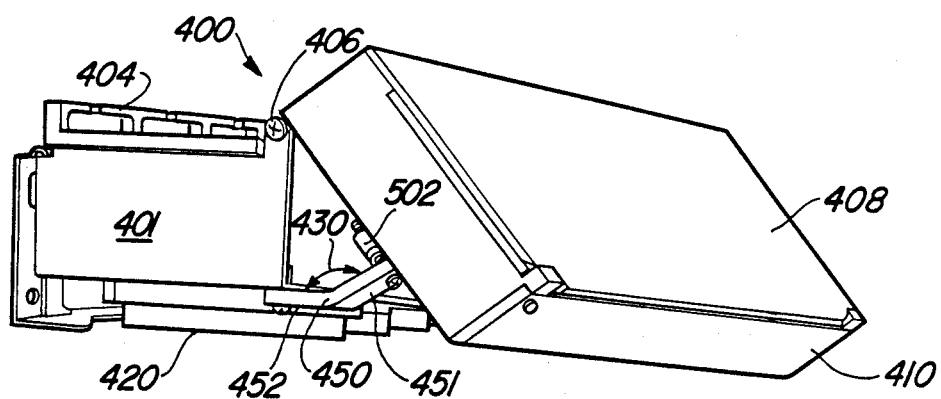
FIG. 4 is a perspective view of a second type of connector block with a second type of bracket holding the cross-connect field in a desired orientation.
Figure 5:
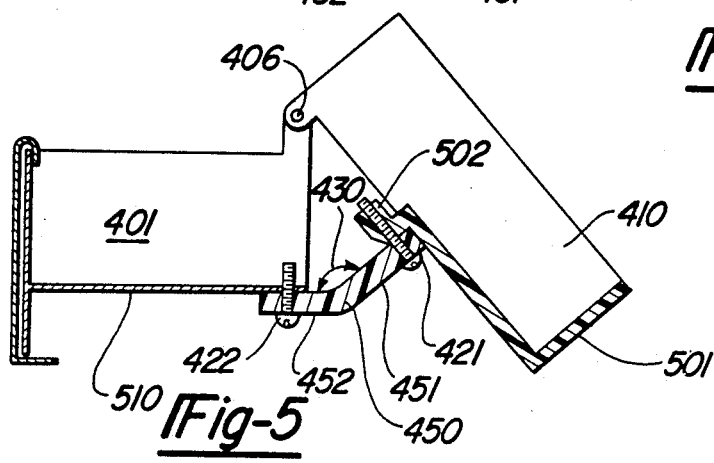
FIG. 5 is a cross-sectional view of the connector block and associated bracket of FIG. 4.

A second type of connector block suitable for use with the invention is the model 582-1004-341 from Telzon, Inc. A perspective view of the Telzon connector block and the bracket arranged pursuant to the invention for use with this block is set forth in the perspective view of FIG. 4 and in the cross-sectional view of FIG. 5. With reference to FIGS. 4 and 5, connector block 400 includes a rotatable terminal field carrier 410 which is normally oriented in a vertical plane. In FIG. 4 a front cover 408 over the terminal strip field is shown in the closed position. Carrier 410 is coupled to each side housing wall 401 of the connector block 400 via a hinge pin 406. As is conventionally provided, there are a plurality of cable guides 404 at the rear of the connector block 400. Additionally, cable guides are provided along the top edge of the terminal cross-connect field. These guides are not shown in the view of FIG. 4 and FIG. 5, since the hinged terminal field cover 408 is shown in its closed position. The Telzon type connector block also may optionally include connectorized terminal strips 420 at the bottom of the connector block housing for receipt of connectorized cables from central office equipment.

To effect double blocking with the Telzon type connector block shown in FIGS. 4 and 5, a second type of adaptor bracket 450 has a first section 451 coupled by bolt 421 to a flange extension 502 of mounting flange 501 of carrier 410. Bracket 450 has a second adaptor section 452 coupled to the bottom face 510 of the connector block housing by a bolt 422. Angle 430 between the first bracket section 451 and the second bracket section 452 is comprised of 180 degrees minus the desired angle that the terminal field is to make with the vertical plane.

Normally, bolt 422 goes through the flange extension 502 to lock the carrier 410 with its terminal strip field in the vertical plane.

A third type of connector block suitable for use with the invention is the 89B type block also in common use throughout the Bell operating companies. The 89B type block is shown in the partial perspective view of FIG. 6 and in the cross-sectional view of FIG. 7. With reference to FIGS. 6 and 7, connector block 600 also has a rotatable terminal field carrier 604 for positioning terminal strip field 602 (the underside of which is shown in the view of FIG. 6) in a predetermined angle with respect to the vertical plane. Rotatable terminal field carrier 604 is hingedly coupled to the housing of block 600 by hinge pin 701.

A third type of adaptor bracket for effecting the desired positional change is bracket 620 which has a mounting extension 627 with a bore 625 for receipt of a bolt 641 for threadingly engaging a suitable threaded bore in the bottom wall 606 of connector block 600. Edge 621 of bracket 620 bears against the undersurface of the rotatable terminal field carrier 604 and includes a bore 626 for receipt of a bolt 641 for attaching bracket 620 to the rotatable terminal field carrier 604. The desired angle with the vertical is shown at 623 and is between the vertical plane and the bearing surface 621 of bracket 620. Surface 622 is also at an angle to the horizontal plane providing clearance between the bracket and the carrier 604.

Normally, in the absence of the bracket 620 a single bolt passes through the bore in carrier 604 and then into the bore in the bottom wall 606 of the connector block housing to retain the carrier 604 and its associated terminal field 602 in a vertical plane.

For clarity of the illustrated embodiments, the adaptor brackets designed in accordance with the principles of the invention for use with the various types of connector block set forth in FIGS. 2–7 are shown in isolated perspective views of FIGS. 8, 9 and 10. Preferably, all the brackets designed in accordance with the principles of the invention are fashioned from a nonconductive material such as plastic or plexiglass.

Figure 3:
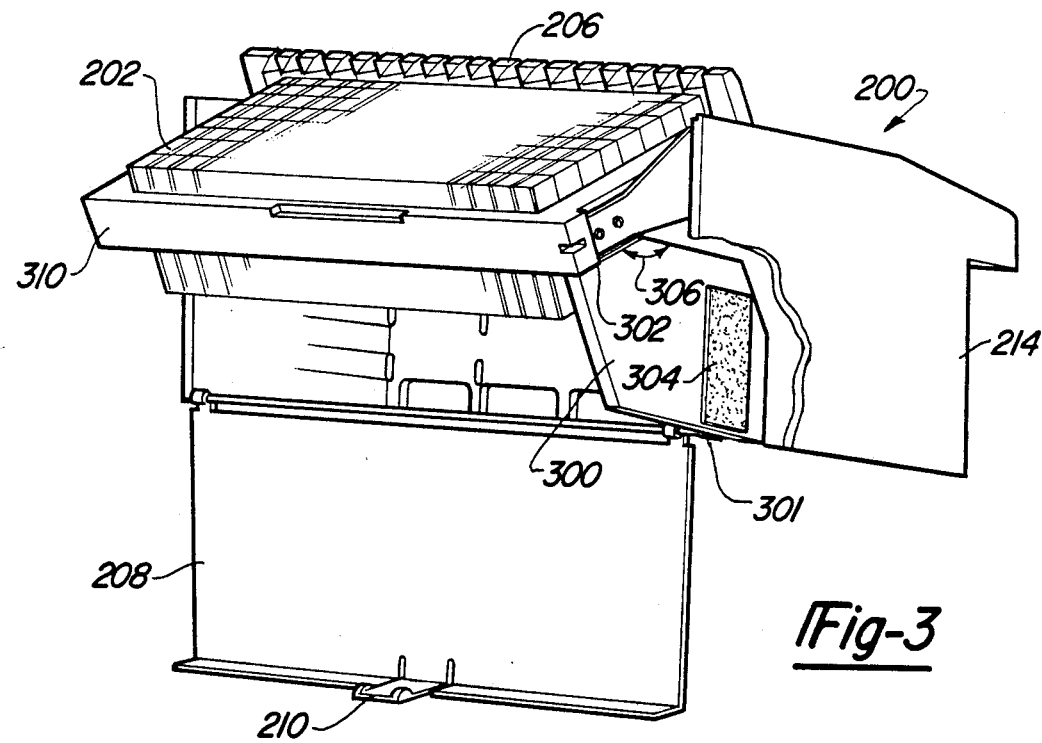
FIG. 3 is a perspective view of the connector block of FIG. 2 with its cross-connect field rotated for double blocking access using a first type of adaptor bracket designed in accordance with the principles of the invention.

FIG. 8 is a perspective view of the bracket 300 used with the connector block of FIGS. 2 and 3. Bracket 300 includes an angle 306 between its bearing surface 302 and a horizontal top surface, which angle comprises 90 degrees plus the desired angle that the terminal strip field is to incline from the vertical plane. Double backed adhesive 304 enables the temporary affixing of bracket 300 to a sidewall of connector block 200 of FIGS. 2 and 3.

FIG. 9 is a perspective view of the bracket 620 used with the connector block of FIGS. 6 and 7 and includes angle 623 which is the desired angle to the vertical of the terminal strip field of the connector block. Bracket 620 also includes two bores 625 and 626 for receipt of the threaded bolts when the bracket 620 is to be mounted between the rotatable terminal field carrier 604 and the bottom wall 606 of the housing of the connector block 600 of FIGS. 6 and 7.

FIG. 10 is a perspective view of the bracket 450 used with the connector block of FIGS. 4 and 5. Bracket 450 has two sections, 451 and 452, the angle between the two shown at 430 comprising 180 degrees minus the desired angle from the vertical plane of the cross-connect field in carrier 410. Bracket 450 includes bores 455 and 454 for receipt of the bracket coupling bolts. Bore 454 includes a countersink 453.

The invention has been described with reference to preferred embodiments, the details of which are to be taken for the sake of example only. The scope and spirit of the invention is to be defined by the appended claims.

What is claimed is:

1. A method of mounting a new connector block in front of an existing connector block mounted at a distributing frame in a telephone central office, the existing connector block having a connector block housing and a terminal field mounted to the housing and normally lying in a first predetermined plane at the distributing frame, the terminal field being rotatable with respect to the housing, the method comprising:
   rotating the terminal field of the existing connector block away from the first predetermined plane such that the terminal field will be accessible by lying in a second predetermined plane at a preselected angle to the first predetermined plane;
   placing an adaptor bracket having first and second surfaces between the rotated terminal field and a surface of the connector block housing such that the first surface abuts the surface of the housing and the second surface extends at the preselected angle to the first predetermined plane and abuts the terminal field to maintain the terminal field at the preselected angle; and
   placing and supporting said new connector block in front of said existing connector block in a manner allowing continued accessibility to the terminal field of said existing connector block as disposed in said second predetermined plane.

2. The method of claim 1 wherein the adaptor bracket is affixed with threaded bolts passing through portions of said bracket for engagement with threaded bores existing in the connector block.

3. The method of claim 1 wherein the adaptor bracket is affixed with adhesive means.

4. The method of claim 1 wherein the adaptor bracket is fashioned from a nonconductive plastic material.

5. The method of claim 2 wherein the adaptor bracket is fashioned from a nonconductive plastic material.

6. The method of claim 3 wherein the adaptor bracket is fashioned from a nonconductive plastic material.

7. In combination, an adaptor bracket and a connector block for a distributing frame, the connector block having a connector block housing and a terminal field means, said terminal field means including a terminal field and a carrier supporting said terminal field, said terminal field having a front face at which certain wiring connections are to be made, said front face being directed outwardly from one side of said housing, said terminal field and carrier being rotatable about a top portion of the connector block housing from a normal position wherein the terminal field lies in a preselected vertical plane, said adaptor bracket comprising a body portion having a first surface at one end and a second surface at an opposite end;

said first surface arranged for abutting engagement with a surface of the connector block housing; and said second surface arranged for abutting engagement with said carrier;

said body portion further including means intermediate said ends and extending at a predetermined angle with respect to the preselected vertical plane for supporting said carrier in a second plane at a predetermined angle with respect to the preselected vertical plane, whereby the front face of the terminal field is readily accessible in said second plane from said one side of said housing.

8. The adaptor bracket of claim 7 further comprising means for enabling the adaptor bracket to be rigidly coupled to at least one of the connector block housing and carrier.

9. The adaptor bracket of claim 8 wherein the means for enabling comprises at least one bore through the adaptor bracket shaped for sliding receipt of a threaded bolt.

10. The adaptor bracket of claim 8 wherein the means for enabling comprises a double sided adhesive layer coupling the adaptor bracket to at least one of the connector block housing and carrier.

11. The adaptor bracket of claim 7 wherein the preselected plane is substantially vertical with respect to a supporting base of the distributing frame.

12. The adaptor bracket of claim 8 wherein the preselected plane is substantially vertical with respect to a supporting base of the distributing frame.

13. The adaptor bracket of claim 9 wherein the preselected plane is substantially vertical with respect to a supporting base of the distributing frame.

14. The adaptor bracket of claim 10 wherein the preselected plane is substantially vertical with respect to a supporting base of the distributing frame.

15. The adaptor bracket of claim 7 wherein the adaptor bracket is fashioned from a nonconductive plastic material.

16. In combination, an adaptor bracket and a connector block for a distributing frame, the connector block having a connector block housing and a terminal field having a carrier rotatable in the connector block housing from a normal position wherein the terminal field lies in a preselected plane, the adaptor bracket comprising:

a first surface arranged for abutting engagement with a surface of the connector block housing; and a second surface arranged for abutting engagement with the terminal field carrier and extending at a predetermined angle with respect to the preselected plane, such that the bracket maintains a plane of the terminal field at the predetermined angle with respect to the preselected plane;

means for enabling the bracket to be rigidly coupled to at least one of the connector block housing and terminal field carrier; and the means for enabling comprising at least one bore through the adaptor bracket shaped for sliding receipt of a threaded bolt.

17. In combination, an adaptor bracket and a connector block for a distributing frame, the connector block having a connector block housing and a terminal field having a carrier rotatable in the connector block housing from a normal position wherein the terminal field lies in a preselected plane, the adaptor bracket comprising:

a first surface arranged for abutting engagement with a surface of the connector block housing; and a second surface arranged for abutting engagement with the terminal field carrier and extending at a predetermined angle with respect to the preselected plane, such that the bracket maintains a plane of the terminal field at the predetermined angle with respect to the preselected plane; means comprising a double sided adhesive layer for enabling the bracket to be rigidly coupled to at least one of the connector block housing and terminal field carrier.

18. The adaptor bracket of claim 16 wherein the preselected plane is substantially vertical with respect to a supporting base of the distributing frame.

19. The adaptor bracket of claim 17 wherein the preselected plane is substantially vertical with respect to a supporting base of the distributing frame.

20. In combination, an adaptor bracket and a connector block for a distributing frame, the connector block having a connector block housing and a terminal field means, said terminal field means including a terminal field having a front face at which certain wiring connections are to be made, said front face being directed outwardly from one side of said housing, said terminal field means being rotatable about a top portion of the connector block housing from a normal position wherein the terminal field lies in a preselected plane, said adaptor bracket including means for supporting said terminal field means in a second plane at a predetermined angle with respect to the preselected plane such that the front face of the terminal field is readily accessible in said second plane from said one side of said housing.

* * * * *